US011068418B2

(12) United States Patent
Borlick et al.

(10) Patent No.: US 11,068,418 B2
(45) Date of Patent: *Jul. 20, 2021

(54) DETERMINING MEMORY ACCESS CATEGORIES FOR TASKS CODED IN A COMPUTER PROGRAM

(71) Applicant: INTERNATIONAL BUSINESS MACHINES CORPORATION, Armonk, NY (US)

(72) Inventors: Matthew G. Borlick, Tucson, AZ (US); Lokesh M Gupta, Tucson, AZ (US); Trung N. Nguyen, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/418,989

(22) Filed: May 21, 2019

(65) Prior Publication Data

US 2019/0272238 A1    Sep. 5, 2019

Related U.S. Application Data

(63) Continuation of application No. 15/993,583, filed on May 30, 2018, now Pat. No. 10,346,317, which is a
(Continued)

(51) Int. Cl.
*G06F 12/00* (2006.01)
*G06F 12/128* (2016.01)
(Continued)

(52) U.S. Cl.
CPC .......... *G06F 12/128* (2013.01); *G06F 9/4881* (2013.01); *G06F 9/5044* (2013.01);
(Continued)

(58) Field of Classification Search
CPC .... G06F 12/128; G06F 9/4881; G06F 9/5044; G06F 9/5083; G06F 12/0811;
(Continued)

(56) References Cited

U.S. PATENT DOCUMENTS 7,958,320 B2    6/2011    Raikin et al.
8,635,405 B2    1/2014    Nishihara et al.
(Continued)

FOREIGN PATENT DOCUMENTS

WO    2015070789 A1    5/2015

OTHER PUBLICATIONS

Trace-Core Processors, IP.com Prior Art Database Technical Disclosure, IP.com Number: IPCOM000199882D, Sep. 20, 2010, pp. 17.
(Continued)

*Primary Examiner* — Gurtej Bansal
(74) *Attorney, Agent, or Firm* — Konrad Raynes Davda & Victor LLP; David W. Victor

(57) ABSTRACT

Provided are a computer program product, system, and method for determining cores to assign to cache hostile tasks. A computer system has a plurality of cores. Each core is comprised of a plurality of processing units and at least one cache memory shared by the processing units on the core to cache data from a memory. A task is processed to determine one of the cores on which to dispatch the task. A determination is made as to whether the processed task is classified as cache hostile. A task is classified as cache hostile when the task accesses more than a threshold number of memory address ranges in the memory. The processed task is dispatched to at least one of the cores assigned to process cache hostile tasks.

20 Claims, 5 Drawing Sheets

Related U.S. Application Data continuation of application No. 15/264,406, filed on Sep. 13, 2016, now Pat. No. 10,169,248.

(51) Int. Cl.

| | | |
|---|---|---|
| *G06F 12/0811* | (2016.01) | |
| *G06F 12/084* | (2016.01) | |
| *G06F 9/50* | (2006.01) | |
| *G06F 12/0871* | (2016.01) | |
| *G06F 9/48* | (2006.01) | |
| *G06F 12/12* | (2016.01) | |

(52) U.S. Cl.
CPC .......... *G06F 9/5083* (2013.01); *G06F 12/084* (2013.01); *G06F 12/0811* (2013.01); *G06F 12/0871* (2013.01); *G06F 12/12* (2013.01); *G06F 2212/283* (2013.01); *G06F 2212/314* (2013.01); *G06F 2212/70* (2013.01)

(58) Field of Classification Search
CPC .... G06F 12/084; G06F 12/0871; G06F 12/12; G06F 2212/283; G06F 2212/314; G06F 2212/70

See application file for complete search history.

(56) References Cited

U.S. PATENT DOCUMENTS

| | | | |
|---|---|---|---|
| 8,930,950 | B2 | 1/2015 | Busaba et al. |
| 8,954,700 | B2 | 2/2015 | Ansari et al. |
| 9,606,835 | B1 | 3/2017 | Borlick et al. |
| 10,169,248 | B2 | 1/2019 | Borlick et al. |
| 10,204,060 | B2 | 2/2019 | Borlick et al. |
| 2002/0040382 | A1 | 4/2002 | Ueda |
| 2003/0009648 | A1 | 1/2003 | Doing et al. |
| 2005/0071584 | A1 | 3/2005 | Griffin et al. |
| 2005/0086405 | A1 | 4/2005 | Kobayashi et al. |
| 2006/0150189 | A1 | 7/2006 | Lindsley |
| 2006/0253661 | A1 | 11/2006 | Bass et al. |
| 2007/0214333 | A1 | 9/2007 | Nijhawan et al. |
| 2011/0061058 | A1 | 3/2011 | Nonogaki |
| 2011/0276787 | A1 | 11/2011 | Koga et al. |
| 2013/0047162 | A1 | 2/2013 | Stefanov et al. |
| 2013/0086424 | A1* | 4/2013 | Smiljanic ............ G06F 9/45558 714/32 |
| 2014/0013330 | A1 | 1/2014 | Wang et al. |
| 2015/0135186 | A1 | 5/2015 | Lin et al. |
| 2015/0302219 | A1 | 10/2015 | Lahteenmaki |
| 2016/0253212 | A1 | 9/2016 | Solihin |
| 2016/0350156 | A1 | 12/2016 | Lo et al. |
| 2018/0074851 | A1 | 3/2018 | Borlick et al. |
| 2018/0074974 | A1 | 3/2018 | Borlick et al. |
| 2018/0276144 | A1 | 9/2018 | Borlick et al. |

OTHER PUBLICATIONS

"The IBM Power8 Processor Core Microarchitecture", IBM Corporation, IBM DeveloperWorks AIX Virtual User Group Feb. 18, 2016 webinar, pp. 126.

U.S. Appl. No. 15/269,640, filed Sep. 19, 2016.

U.S. Appl. No. 15/264,382, filed Sep. 13, 2016.

Office Action dated Feb. 14, 2018, pp. 21, for U.S. Appl. No. 15/264,382, filed Sep. 13, 2016.

Response dated May 14, 2018, pp. 12, to Office Action dated Feb. 14, 2018, pp. 21, for U.S. Appl. No. 15/264,382.

Final Office Action dated Jun. 21, 2018, pp. 15, for U.S. Appl. No. 15/264,382.

Response dated Aug. 21, 2018, pp. 12 to Office Action dated Feb. 14, 2018, pp. 21, for U.S. Appl. No. 15/264,382.

Notice of Allowance dated Oct. 1, 2018, pp. 14, for U.S. Appl. No. 15/264,382.

U.S. Appl. No. 15/264,406, filed Sep. 13, 2016.

Notice of Allowance dated Jan. 29, 2018, pp. 17, for U.S. Appl. No. 15/264,406.

Notice of Allowance dated Mar. 26, 2018, pp. 10, for U.S. Appl. No. 15/264,406.

Notice of Allowance dated Aug. 28, 2018, pp. 9, for U.S. Appl. No. 15/264,406.

U.S. Appl. No. 15/993,583, filed May 30, 2018.

Office Action dated Jul. 11, 2018, pp. 16, for U.S. Appl. No. 15/993,583.

Response dated Oct. 11, 2018, pp. 9, to Office Action dated Jul. 11, 2018, pp. 16, for U.S. Appl. No. 15/993,583.

Final Office Action dated Nov. 16, 2018, pp. 16, for U.S. Appl. No. 15/993,583.

Response dated Feb. 18, 2019, pp. 8, to Final Office Action dated Nov. 16, 2018, pp. 16, for U.S. Appl. No. 15/993,583.

Notice of Allowance dated Feb. 28, 2019, pp. 8, for U.S. Appl. No. 15/993,583.

List of IBM Patents and Applications Treated as Related, dated 2019-04-xx, pp. 2.

* cited by examiner

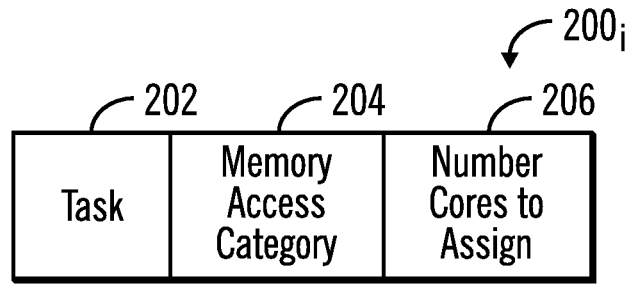
Task-Memory Access Category Assignment
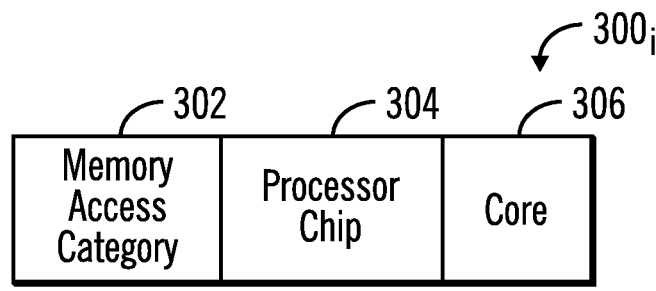
Core Dispatch Table Entry
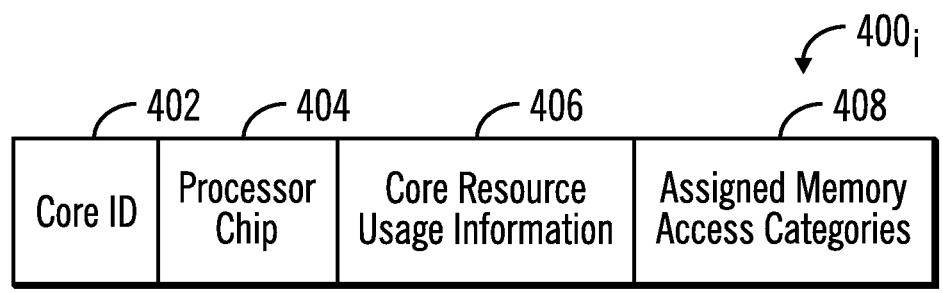
Core Information

DETERMINING MEMORY ACCESS CATEGORIES FOR TASKS CODED IN A COMPUTER PROGRAM

BACKGROUND OF THE INVENTION

1. Field of the Invention

The present invention relates to a computer program product, system, and method for determining cores to assign to cache hostile tasks.

2. Description of the Related Art

A cache management system buffers tracks in a storage device or memory recently accessed as a result of read and write operations in a faster access memory device than the storage device or memory storing the requested data. Subsequent read requests to data in the faster access cache memory are returned at a faster rate to tasks than the rate at which data would be returned from the slower access storage or memory, thus reducing read latency.

A computer system implementing cache management may have multiple processor chips, each processor chip including multiple processing cores, where each core has one or more central processing units (CPUs) to execute tasks and threads of operations. Each processor CPU may have its own local cache to store data used by the tasks executed by the CPU. A core may also include additional caches to cache data for the multiple CPUs on the core. Further, the processor chip may have a processor cache to cache data for the multiple cores implemented on the processor chip.

If a CPU executing a task requires data not currently in the local cache for that task, then the CPU needs to access the required data from a core cache, a processor cache or the memory, expunge the data currently in the cache, and then copy the data from the memory or core cache to the local cache, e.g., L1 cache.

Described embodiments provide improved techniques for caching data in a multi-core processing system.

SUMMARY

A first embodiment comprises a computer program product, system, and method for determining cores to assign to cache hostile tasks. A computer system has a plurality of cores. Each core is comprised of a plurality of processing units and at least one cache memory shared by the processing units on the core to cache data from a memory. A task is processed to determine one of the cores on which to dispatch the task. A determination is made as to whether the processed task is classified as cache hostile. A task is classified as cache hostile when the task accesses more than a threshold number of memory address ranges in the memory. The processed task is dispatched to at least one of the cores assigned to process cache hostile tasks.

With the first embodiment, assigning cache hostile tasks, which continually require memory address ranges in cache to be replaced, to a common processor prevent cache hostile tasks from disrupting cache access for tasks accessing a common memory address range assigned to other cores. Limiting cache hostile tasks to their own cores devoted to cache hostile tasks prevents cache hostile tasks from polluting the cache memory used by tasks accessing a common range of memory addresses and reduces latency for such other tasks.

In a second embodiment, the first embodiment can optionally include that computer program code in which the tasks are coded is processed to determine memory address ranges in the memory the tasks executes. For each of the tasks processed in the computer program product, a determination is made that the task accesses more than the threshold number of the memory address range and indication is made in task information that the task is cache hostile in response to determining that the task accesses more than the threshold number of memory address ranges in the memory.

With the second embodiment, the computer program code may be processed in advance to determine the tasks and whether the tasks are cache hostile to indicate in task information. This allows the task information on cache hostile tasks to subsequently be used to determine whether a new task being processed is cache hostile so that the cache hostile task can be assigned to a core that is devoted to processing cache hostile tasks.

In a third embodiment, the first embodiment can optionally include that for each of the tasks processed in the computer program product, a determination is made that the task accesses less than or equal to the threshold number of the memory address ranges in the memory, a determination is made of a memory access category associated with a memory address range the task accesses in response to determining that the task accesses less than or equal to the threshold number of the memory address ranges in the memory, and indication is made of the determined memory access category for the task.

With the third embodiment, if a tasks is not cache hostile, then a determination is made of a memory access category associated with the memory address range accessed by the tasks and this determined memory access category is indicated for the task. This information may then later be used to determine the core to which the task assigned the memory access category is assigned.

In a fourth embodiment, the third embodiment can optionally include that the processed task is assigned to one of the cores not assigned to process cache hostile tasks in response to determining that the processed task is not a cache hostile task.

With the fourth embodiment, tasks that are not cache hostile are not assigned to the cores that are assigned to process cache hostile tasks so that non-cache hostile tasks will avoid latency resulting from cache hostile tasks on the same core continually moving different memory addresses into the cache.

In a fifth embodiment, the first embodiment can optionally include determining a memory access category of a plurality of memory access categories associated with memory address ranges in the memory accessed by the task in response to determining that the processed task is not cache hostile and dispatching the processed task to the core assigned the determined memory access category. Cores assigned to the memory access categories are not assigned to process cache hostile tasks.

With the fifth embodiment, tasks that are not cache hostile and access a common memory address range to be assigned a same memory access category are assigned to the same processor core, to which hostile cache tasks are not assigned. Limiting tasks to a core that process the same memory address ranges reduces the likelihood that a task needing data for a memory address range will not locate the common memory address range in a shared cache. This reduces latency because tasks may locate their memory address range data in a closer shared cache, which will not have its data continually removed in the cache with data for cache hostile tasks.

With the described embodiments, the tasks classified as cache hostile execute in the cores assigned to process cache hostile tasks to access a plurality of the memory address ranges in the memory. The tasks, assigned to one of the memory access categories, accesses the memory address range in the memory associated with the memory access category to which the task is assigned. This limits non-cache hostile tasks to cores that process tasks accessing the same memory address range.

BRIEF DESCRIPTION OF THE DRAWINGS

FIG. 2 illustrates an embodiment of a task-memory access category assignment instance.

FIG. 3 illustrates an embodiment of a core dispatch table entry.

FIG. 4 illustrates an embodiment of core information maintained for each of the cores in a multi-core processing system.

DETAILED DESCRIPTION

Figure 1:
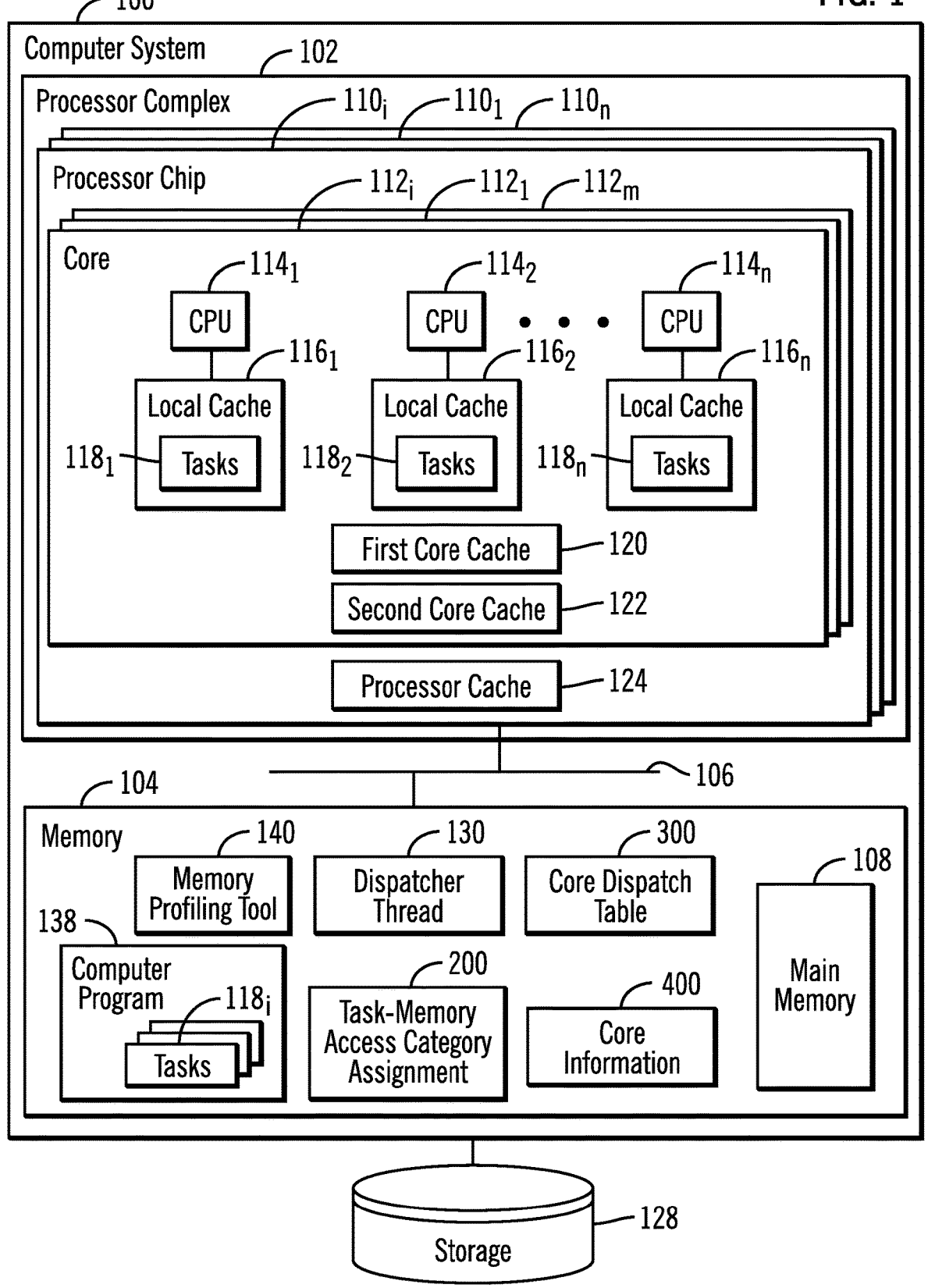
FIG. 1 illustrates an embodiment of a computing environment.

A core of a multi-core processor may concurrently execute multiple tasks in different CPUs on the core. If the tasks are accessing different memory address ranges in a system memory, then data in the shared core caches may continually have to be replaced when a task requests a different memory region than that currently maintained in the shared core caches. In such case, the cache is flushed of its current data and data from a different memory region is transferred from another cache or the storage into the shared core caches. This is referred to as cache pollution, where one task forces the current data in a shared cache being used by another task to be flushed out of the cache to make room for data for a different range of memory addresses needed by the currently executing tasks. Further, certain tasks may be cache hostile in that they continually access many different memory address ranges, thus requiring that data be constantly removed and brought into the shared core caches. The tasks executing in a core experience increased latency when data in the shared core caches is continually removed and replaced with data from different ranges of memory addresses because the tasks must wait for their required data to be brought into the shared and local core caches to use.

Described embodiments provide improved techniques for assigning tasks to cores to reduce cache access latency. When processing a task, a task dispatcher determines a memory access category of a plurality of memory access categories to which the processed task is assigned and dispatches the processed task to the core assigned the determined memory access category A memory access category may be defined as a memory address range. In this way, tasks operating in a same memory address range of the system memory are assigned to a same core associated with that memory access category/memory address range. When tasks operating in one memory address range or having a same pattern of memory access are assigned to the same core, then data for the memory address range in the shared core caches is used by the tasks assigned to that core and the tasks do not need to have data in other memory address ranges brought into the shared core caches because the tasks are operating on the same memory address range. This avoids the cache latency that would result from continually having to remove and replace different memory address ranges in the shared core caches.

In further embodiments, if a processed task is classified as cache hostile, which means the task continually access different ranges of memory addresses, then that cache hostile task may be dispatched to a core that is dedicated to processing cache hostile tasks. By segregating cache hostile tasks to cores dedicated to cache hostile tasks, the disruptions and latency caused by cache hostile tasks that continually require data to be removed and replaced in the shared core caches is localized to specific cores assigned to handle such cache hostile tasks. In this way, the cache hostile tasks will not introduce latency to tasks that are operating within the same memory address range on one core dedicated to that memory address range or memory access category.

FIG. 1 illustrates an embodiment of a computing system 100 having a processor complex 102 that may access a memory 104 over a system bus 106 to access data in a main system memory 108. The processor complex 102 may include one or more processor chips $110_1 \ldots 110_n$, comprising an integrated circuit in a physical packaging, where each processing chip $110_i$ implements a plurality of processing cores $112_1 \ldots 112_m$. Each core $112_i$ includes a plurality of central processing units (CPUs) $114_1, 114_2 \ldots 114_n$, also referred to herein as processors or processing units. Each of the CPUs $114_1, 114_2 \ldots 114_n$ include a local cache $116_1, 116_2 \ldots 116_n$ such as an L1 cache, in which information is cached for tasks $118_1, 118_2 \ldots 118_n$ executed by the corresponding CPU $114_1, 114_2 \ldots 114_n$. A CPU $114_1, 114_2 \ldots 114_n$ does not need to obtain a lock to access items in its local cache $116_1, 116_2 \ldots 116_n$.

Each core $112_i$ may further include one or more shared caches, such as first core cache 120, e.g., L2 cache, and second core cache 122, e.g., L3 cache, implemented in memory on the core $112_i$, and shared by the CPUs $114_1, 114_2 \ldots 114_n$ on the core $112_i$. The core caches 120 and 122 are not accessible to tasks executing on other of the cores on the same or different processor chips $110_1 \ldots 110_n$. Further cores $112_1 \ldots 112_m$ on a processing chip $110_i$ may share a processor cache 124 implemented on the processor chip $110_i$.

The main memory 108 stores data from an attached storage 128, such as non-volatile storage devices, including solid state drives, hard disk drives, which may be configured in an array, such as a Redundant Array of Independent Disks (RAID), Just a Bunch of Disks (JBOD), etc. When a task $118_i$ requires data from the storage 128, the data is first brought into the memory 108, which is then transferred to store in the processor cache 124, first 120 and second 122 core caches as well as the local cache $116_i$ of the CPU $114_i$ executing the task $118_i$ requiring the data.

A CPU $114_i$ comprising one of the CPUs $114_1, 114_2 \ldots 114_n$ on one of the cores $112_1 \ldots 112_m$ executes a dispatcher thread 130 to select a core $112_i$ on which a task $118_i$ to dispatch will execute. The dispatcher thread 130 access a task-memory access category assignment 200 to determine the memory access category for a task $118_i$ to dispatch and then uses the core dispatch table 300 to determine a core $112_i$, on one of the processing chips $110_i$, to which the task $118_i$ will be dispatched to execute. The dispatch thread 130 may further utilize core information 400 in determining a core to select for dispatching a task.

The tasks $118_i$ that are dispatched may be from a computer program 138. A memory profiling tool 140 would process the computer program 138 to simulate execution of the computer program 138 and tasks $118_1$, $118_2$ . . . $118_n$ therein to determine the memory address ranges in the cache 126 that the tasks $118_1$, $118_2$ . . . $118_n$ access during the task operations. The memory profiling tool 140 may utilize a debugging program to simulate execution of the code in debugging mode to determine the memory address ranges that are accessed by the tasks $118_1$, $118_2$ . . . $118_n$. In an alternative embodiment, the memory profiling tool 140 may scan the code of the computer program 138 to determine the memory address ranges for the tasks $118_1$, $118_2$ . . . $118_n$ from the code statements. In such alternative embodiments, the memory profiling tool 140 may scan source or compiled code to determine the memory address ranges the tasks $118_1$, $118_2$ . . . $118_n$ access. The memory profiling tool 140 may then update the task-memory category assignment 200 to indicate the memory access categories for the memory address ranges each of the tasks $118_i$ access during operations.

In the embodiment of FIG. 1, the memory profiling tool 140 is shown within the memory 104 of the computing system 100 that will utilize the task-memory access category assignment 200 to determine cores to use to dispatch tasks $118_1$, $118_2$ . . . $118_n$. In an alternative embodiment, the memory profiling tool 140 may be run external to the computer system 100 and the task-memory access category assignment 200 for a computer program 138 may be provided by an external system running the memory profiling tool 140 or supplied by the developer of the computer program 138 for users to deploy.

The term "processor" as used herein that executes the tasks $118_1$, $118_2$ . . . $118_n$, 130 may comprise a CPU $114_1$, $114_2$ . . . $114_n$ in one or more cores in one or more integrated circuit dies. Further, a "processor" may comprise a CPU or processor implemented in a separate integrated circuit die. Still further, a "processor" may comprise a core or comprise a virtual processor, where each processor may independently execute threads. A task $118_i$ may comprise a unit of execution, such as a thread, process, etc.

The storage 128 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), Non-Volatile Dual In-line Memory Module (NVDIMM), Static Random Access Memory (SRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage 128 may comprise heterogeneous storage devices from different vendors or from the same vendor.

The memory 104 may comprise suitable volatile or non-volatile memory devices, including those described above with respect to the storage 128. The caches $116_1$, $116_2$ . . . $116_n$, 120, 122, and 124 may comprise on-board memory on the processor chips $110_1$ . . . $110_n$ and cores $112_1$ . . . $112_m$, or comprise separate memory devices. In one embodiment, the caches $116_1$, $116_2$ . . . $116_n$, 120, 122, 124, and 108 are arranged in a hierarchy, having increasing amount of address spaces, such that the memory 108 has the largest memory size, the processor cache 124 a second largest memory size to store a subset of memory addresses in the memory 108, the second core cache 122 a third largest memory size to store a subset of memory addresses in the cache 124, the first core cache 120 a fourth largest memory size to store a subset of memory addresses in the cache 122, and the caches $116_1$, $116_2$ . . . $116_n$ a smallest memory size to cache a subset of memory addresses in the first core cache 120. A CPU $114_i$ first tries to access needed data from the local cache $116_i$, and if not there, looks for the data in the caches according to a cache hierarchy from cache 120, 122, 124, through 108. Once the requested data is located in one of the caches 120, 122, 124, 108 or finally the storage 128, the data is then moved through the caches in the order of the cache hierarchy and then finally to the local cache $116_i$ from where the data is accessed.

In one embodiment, the main memory 108 may have a largest address space, the processor cache 124 may have a smaller address space than the main memory 108, and a larger address space than the caches $116_1$, $116_2$ . . . $116_n$, 120, 122, the second core cache 122 may have a large address space than the caches $116_1$, $116_2$ . . . $116_n$, 120.

In one embodiment, the computer system 100 may comprise a storage server or storage controller managing access by host systems to tracks in the storage 128. The tasks $118_1$, $118_2$ . . . $118_n$ may comprise Input/Output (I/O) tasks spawned to handle I/O requests from applications running in the connected host systems. In such case, the task-memory access category assignment 200 may be provided by the host systems submitting the I/O request tasks when executing the computer program 138 in the host systems. In another embodiment, the computer program 138 may comprise a database application or other application program executing tasks to perform application operations which may involve accessing data in the storage 128 and processing the accessed data.

FIG. 2 illustrates an embodiment of an instance of a task-memory access category assignment $200_i$ for one of the tasks $118_i$ including an identifier of a task 202; a memory access category 204 assigned to the task 202; and a number of cores 206 to assign to the memory access category 204. The memory access category may indicate a pattern of memory accesses, such as a range of memory addresses being accessed, a hostile cache access pattern where the tasks access data in different ranges of memory addresses, and other access patterns.

FIG. 3 illustrates an embodiment of a core dispatch entry $300_i$ in the core dispatch table 300, including a memory access category 302 and the processor chip 304 and core 306 on the processor chip 304 that is assigned to process tasks associated with the memory access category 302.

FIG. 4 illustrates an embodiment of an instance of core information $400_i$ in the core information 400 for one of the cores $112_i$, and includes a core identifier (ID) 402 of one of the cores $112_i$, a processor chip 404 including the core 402; core resource usage information 406 providing an amount of core 402 resources being utilized, such as memory resources in the local cache $116_1$, $116_2$ . . . $116_n$ and caches 120, 122, and 124, processing resources in the CPUs $114_1$, $114_2$ . . . $114_n$, and other core resources; and the assigned memory access categories 408 assigned to the core 402 in the core dispatch table 300.

Figure 5:
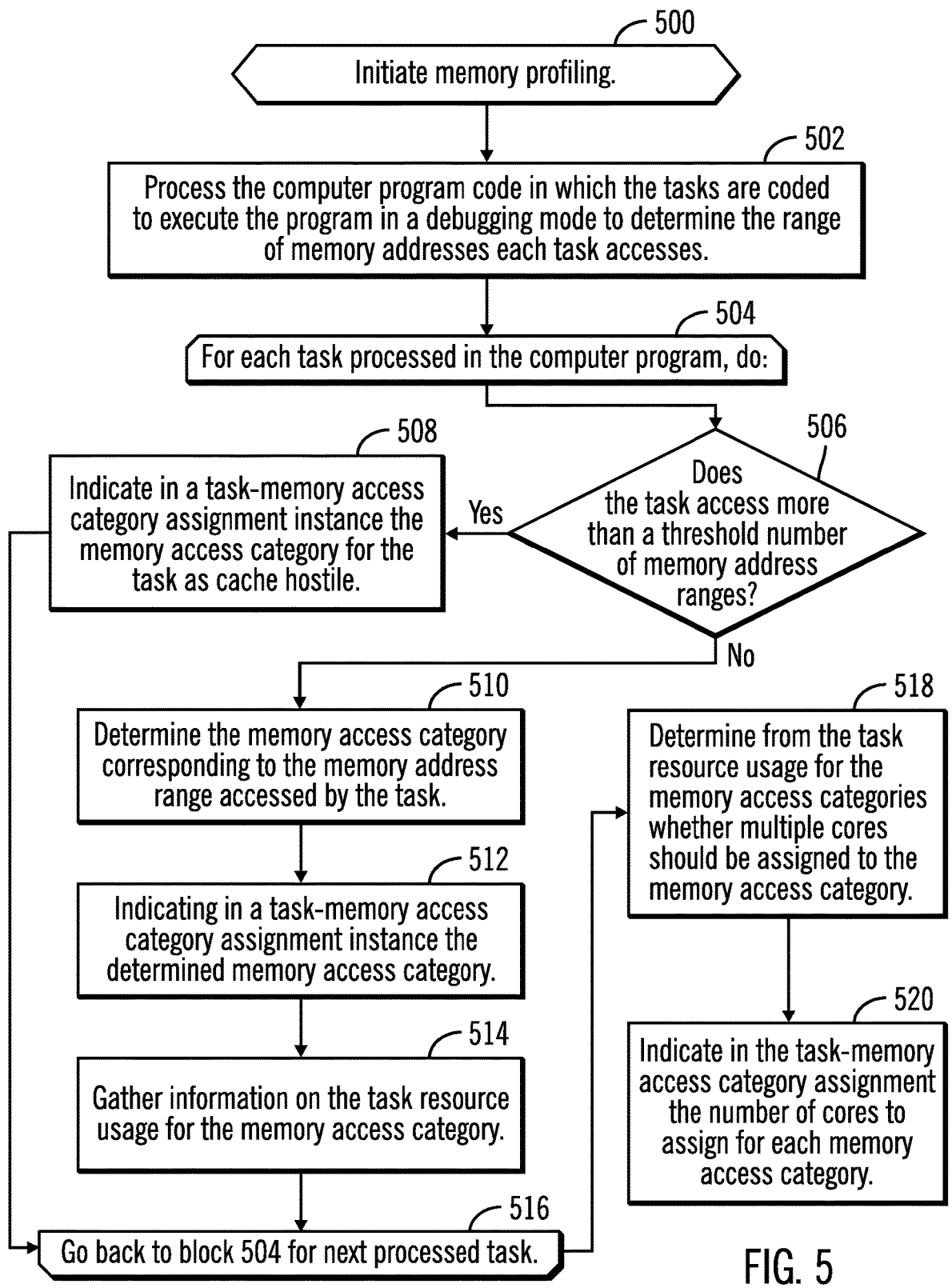
FIG. 5 illustrates an embodiment of operations to determine memory access categories for tasks in a computer program.

FIG. 5 illustrates an embodiment of operations performed by the memory profiling tool 140 to determine the memory access categories for tasks $118_1$, $118_2$ ... $118_n$ in the computer program 138 and generate the task-memory access category assignment 200 for the dispatcher thread 130 to use to assign tasks $118_1$, $118_2$ ... $118_n$ to cores $112_1$ ... $112_m$. The profiling tool 140 may be executed in the computer system 100 or another computer system. Upon initiating (at block 500) memory profiling, the memory profiling tool 140 processes (at block 502) the computer program code 138 in which the tasks are coded to execute the program in a debugging or simulation mode to determine the range of memory addresses each task $118_i$ accesses. In an alternative embodiment, the profiling tool 140 may determine memory address ranges the tasks $118_1$, $118_2$ ... $118_n$ in the computer program 138 execute by scanning the code, such as source code or compiled code, of the computer program 138 in embodiments where the memory address ranges may be determined by examining the content of the computer program 138 code without executing the code in a debugging or simulation mode. For each task $118_i$ processed in the computer program 138, a loop of operations is performed at blocks 504 through 516. If (at block 506) the task $118_i$ is determined to access more than a threshold number of memory address ranges, such as just one memory address range, then indication is made (at block 508) in the task-memory access category assignment instance $200_i$ that the memory access category 204 for the task $118_i$ is cache hostile. A cache hostile task is defined as a task that accesses different ranges or blocks of memory addresses in the cache 126 which requires data to be moved in and out of the smaller caches $116_i$, 120, 122, and 124. Cache hostile tasks continually removing and replacing contents of caches increases processing latency because tasks have to wait for requested data to be moved into the core caches $116_i$, 120, and 122.

If (at block 506) the task $118_i$ does not access more than a threshold number of memory address ranges, then the profiling tool 140 determines (at block 510) the memory access category corresponding to the memory address range accessed by the task and indicates (at block 512) in a task-memory access category assignment instance $200_i$ the determined memory access category in field 204. The profiling tool 140 further gathers information on the task resource usage for the memory access category. After processing all the tasks $118_1$, $118_2$ ... $118_n$ in the computer program 138, the profiling tool 140 determines (at block 518) from the task resource usage for the memory access categories whether multiple cores should be dedicated to tasks assigned the memory access category. A memory access category may be defined as one (or more) of the memory address ranges of the memory 108 or a cache hostile memory access where the task accesses more than a threshold number of memory address ranges. For instance, if during the simulation of executing the computer program 138, the tasks operating in a memory address range corresponding to one memory access category, including the cache hostile category, consume a threshold amount of processing resources, then the memory profiling tool 140 may indicate that that particular memory access category should be assigned to multiple cores to handle the extra load. The determined number of cores to assign for each memory access category is indicated (at block 520) in the task-memory access category assignment 200, such as in field 206.

The memory profiling tool 140 may maintain a mapping of memory address ranges to memory access categories to use to determine the assignment of tasks to memory access categories based on the ranges of memory addresses the tasks access during execution. In one embodiment, there may be only one memory address range assigned to one memory access category. In alternative embodiments, there may be multiple memory address ranges, such as consecutive memory address ranges, assigned to one memory access category. In further alternative embodiments, other memory access patterns for tasks may be used to define the memory access categories in addition to memory address ranges and cache hostile access, such as a type of memory access, e.g., random, sequential, etc.

Figure 6:
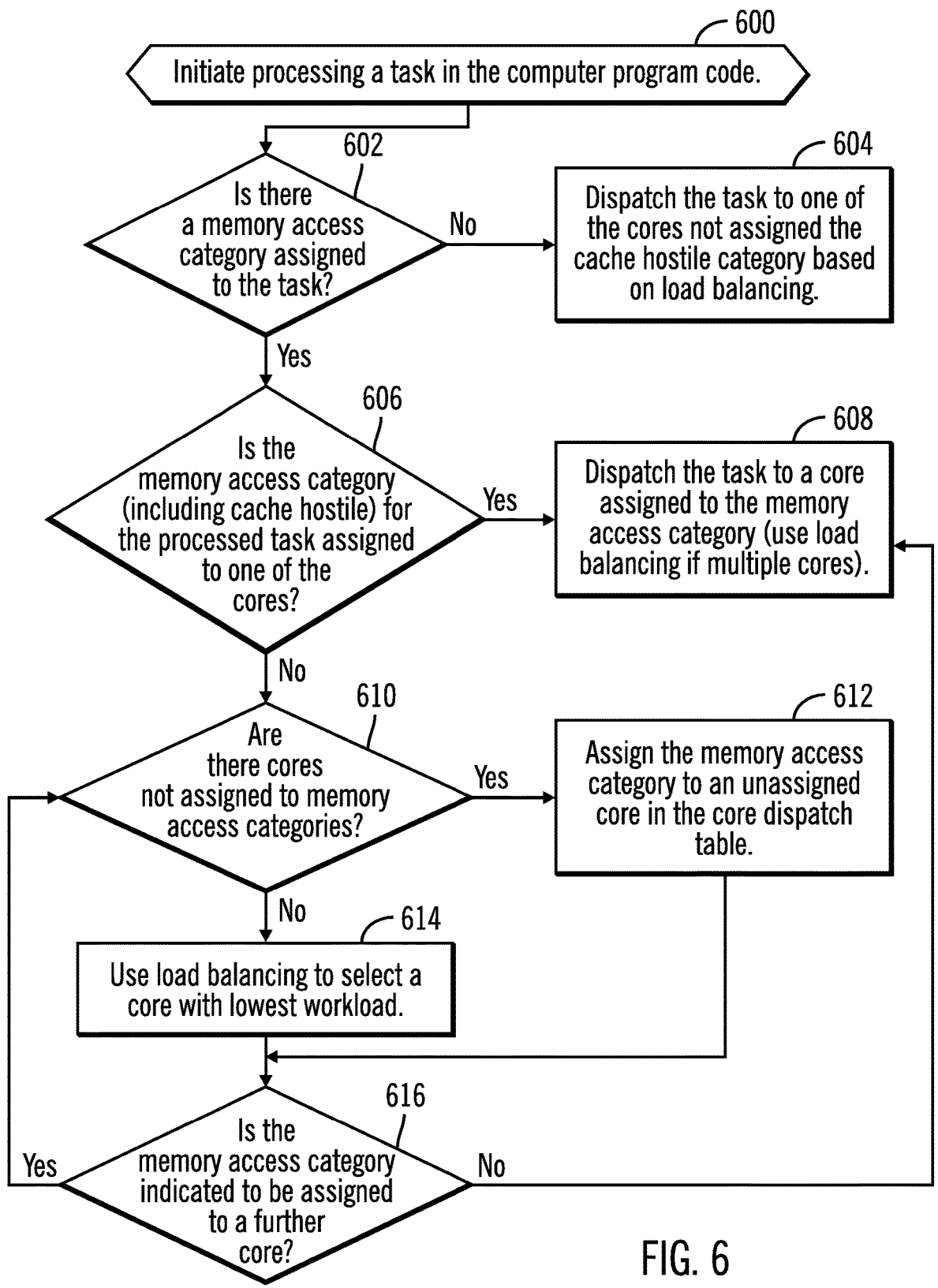
FIG. 6 illustrates an embodiment of operations to assign tasks to a core in a multi-core processing system

FIG. 6 illustrates an embodiment of operations performed by the dispatcher thread 130 to assign memory access categories and dispatched tasks $118_1$, $118_2$ ... $118_n$ to cores $112_1$ ... $112_m$. Upon initiating (at block 600) the processing of a task $118_i$ in the computer program 138, if (at block 602) there is no memory access category 204 assigned to the task $118_i$ to dispatch in a task-memory access category assignment $200_i$ for the task $118_i$, then the dispatcher thread 130 dispatches the task $118_i$ to one of the cores $112_1$ ... $112_m$ in one of the processor chips $110_1$ ... $110_n$ not assigned to the cache hostile category. Load balancing based on the core resource information 406 in the core information 400 may be performed to select one of multiple of the cores to process.

If (at block 602) there is a memory access category assigned to the task and if (at block 606) the memory access category 302 is indicated in a core dispatch table entry $300_i$ as assigned to a core 306, then the dispatcher thread 130 dispatches (at block 608) the task $118_i$ to a core 306 assigned to the memory access category 302. If multiple cores are assigned to the memory access category 302, then load balancing based on the core resource information 406 of the cores assigned to the memory access category 302 may be used to select the core to which to assign the task $118_i$. If (at block 606) the memory access category is not indicated in the core dispatch table 300, i.e., not assigned to a core, then if (at block 610) there are cores $112_1$ ... $112_m$ not assigned to memory access categories, i.e., unassigned cores, then the dispatcher thread 130 assigns (at block 612) the memory access category 204 for the task 202 to an unassigned core $112_i$ in the core dispatch table 300, such as a core dispatch table entry $300_i$ indicating the memory access category 302 and the assigned core in the core field 306. If (at block 610) there are no unassigned cores, then the dispatcher thread 130 uses (at block 614) load balancing based on the core resource usage information 406 for the cores to select one of the already assigned cores to use for the memory access category. In certain embodiments, the core assigned to process cache host tasks may not also be assigned to memory access categories associated with memory address ranges.

If (at block 616) the memory access category for the processed task is indicated to be assigned to additional cores in field 206 in the task-memory access assignment instance $200_i$ for the memory access category 204 of the task 202 being processed, then control returns to block 610 to assign another core $112_i$ to the memory access category. Load balancing may be used to select one of the cores, based on the core resource usage information 406 for the cores, to select one of the already assigned cores to use for the memory access category if multiple cores are assigned to the memory access category. If (at block 616) the memory access category 204 is not indicated to be assigned to another core in the number of cores to assign field 206, then control proceeds to block 608 to dispatch the task $118_i$ to one of the assigned cores for the memory access category 302 in the core dispatch table entry $300_i$ for the memory access category of the task $118_i$ being processed.

Described embodiments provide techniques to assign tasks to cores based on the memory access patterns of the tasks. Tasks accessing a specific memory address range or exhibiting cache hostile access patterns are assigned to the same core. Assigning tasks accessing the same memory address region to a common core reduces the need to bring in different memory address ranges to cache because all the tasks assigned to the core are accessing the same memory address region. This reduces cache latency by avoiding having to expel data from the cache to make room for new memory address ranges being accessed. Further, localizing cache hostile tasks continually accessing different memory address ranges on cores dedicated to cache hostile tasks reduces the cache latency for tasks that operate only within a single range of memory addresses that are assigned to different cores than the cache hostile tasks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
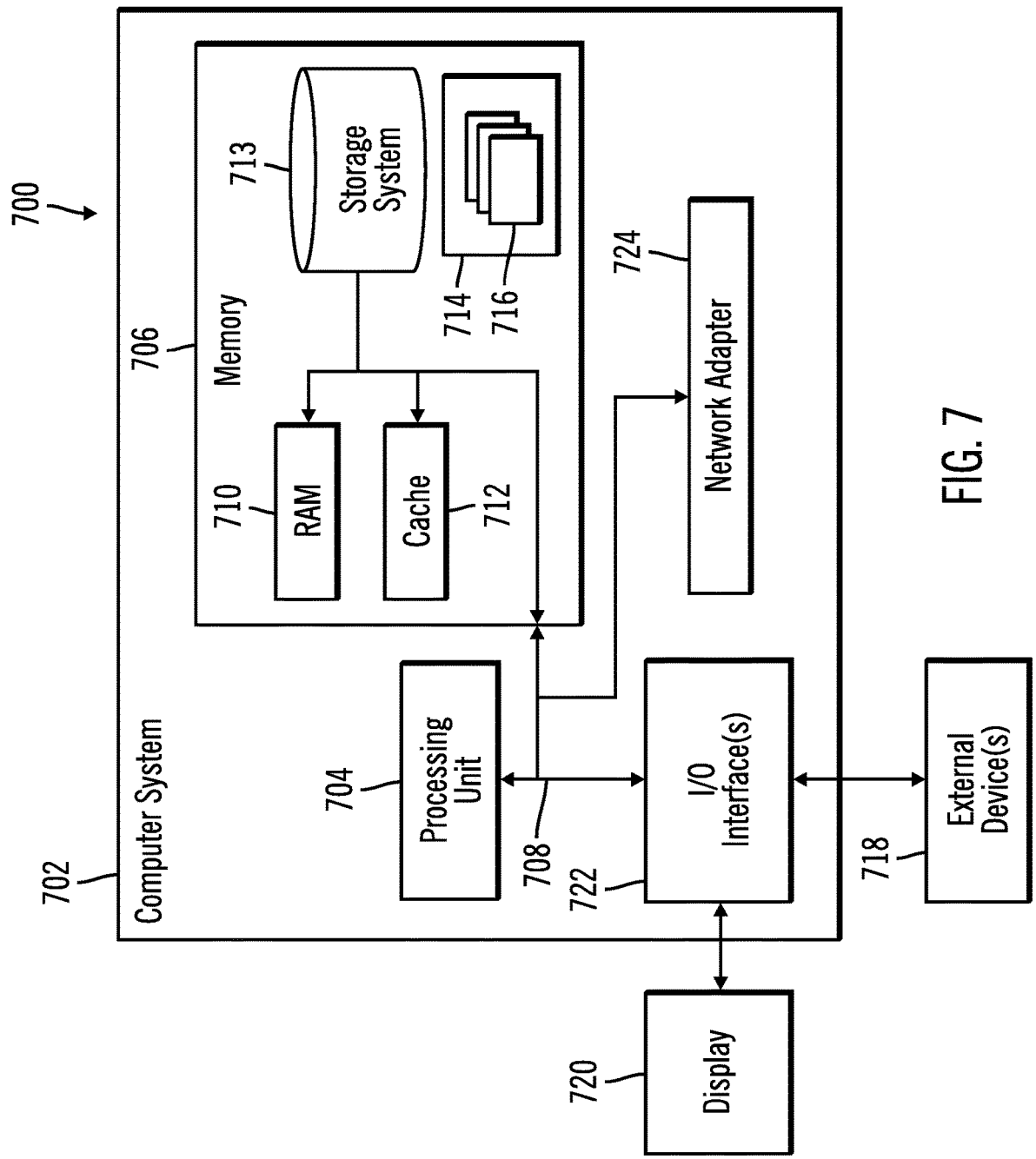
FIG. 7 illustrates a computing environment in which the components of FIG. 1 may be implemented.

The computer system 100 of FIG. 1 may further include components as described with respect to a computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for profiling memory access in a memory shared by tasks executing in a computer system, the computer program product comprising a computer readable storage medium having computer readable program code embodied therein that when executed performs operations, the operations comprising:
    processing a computer program in which tasks are coded to determine ranges of memory addresses each task of the tasks accesses;
    determining, for each task of a plurality of tasks coded in the computer program, a memory access category for the task based on the determined ranges of memory addresses accessed by the task, wherein the determined memory access category indicates a pattern of memory accesses for the task, wherein the determined memory access category comprises one of a plurality of memory access categories defined by different memory access patterns; and
    indicating, in an assignment of memory access categories, the determined memory access category for each task for which the memory access category is determined, wherein the assignment of memory access categories is used to dispatch tasks to processing units.

2. The computer program product of claim 1, wherein the processing the computer program comprises executing the computer program in a debugging mode to determine ranges of memory address each tasks coded in the computer program executes.

3. The computer program product of claim 1, wherein the determining the memory access category for a task comprises:
    determining whether the determined ranges of memory addresses accessed by the task exceeds a threshold number of ranges of memory addresses; and
    determining that the memory access category for a task comprises cache hostile access category in response to determining that the ranges of memory addresses accessed by the task exceeds the threshold number of ranges.

4. The computer program product of claim 1, wherein the determining the memory access category for a task comprises:
    determining a memory access category corresponding to a memory address range accessed by the tasks in response to determining that the memory access category does not comprise a cache hostile access category.

5. The computer program product of claim 4, wherein each of the pattern of memory accesses is defined as at least one range of memory addresses or a cache hostile access category.

6. The computer program product of claim 1, wherein the operations further comprise:
    gathering information on task resource usage for each of the memory access categories while executing the computer program;
    based on the task resource usage, determining a number of at least one processing unit to assign to each of the memory access categories; and
    indicating, for each memory access category of the memory access categories, the number of at least one processing unit determined to assign to the memory access category.

7. The computer program product of claim 6, wherein the determining the number of at least one processing unit to assign to each memory access category of the memory access categories comprises:
    determining whether tasks operating in a memory address range corresponding to a memory access category of the memory access categories consume a threshold amount of processing resources; and
    indicating that the memory access category is assigned multiple processing units in response to determining that the tasks operating in the memory address range corresponding to the memory access category consume more than the threshold amount of processing resources.

8. The computer program product of claim 7, wherein the operations further comprise:
    indicating, in a dispatch table having an entry for each memory access category of the memory access categories, at least one processing unit assigned to process tasks assigned to the memory access category and a processor chip including the at least one processing unit assigned to the memory access category.

9. A system for profiling memory access by tasks, comprising:
    a memory;
    a plurality of processing units;
    a computer readable storage medium having computer readable program code embodied therein that when executed performs operations, the operations comprising:
        processing a computer program in which tasks are coded to determine ranges of memory addresses each task of the tasks accesses;
        determining, for each task of a plurality of tasks coded in the computer program, a memory access category for the task based on the determined ranges of memory addresses accessed by the task, wherein the determined memory access category indicates a pattern of memory accesses for the task, wherein the determined memory access category comprises one of a plurality of memory access categories defined by different memory access patterns; and
        indicating, in an assignment of memory access categories, the determined memory access category for each task for which the memory access category is determined, wherein the assignment of memory access categories is used to dispatch tasks to processing units.

10. The system of claim 9, wherein the processing the computer program comprises executing the computer program in a debugging mode to determine ranges of memory address each tasks coded in the computer program executes.

11. The system of claim 9, wherein the determining the memory access category for a task comprises:
    determining whether the determined ranges of memory addresses accessed by the task exceeds a threshold number of ranges of memory addresses; and
    determining that the memory access category for a task comprises cache hostile access category in response to determining that the ranges of memory addresses accessed by the task exceeds the threshold number of ranges.

12. The system of claim 9, wherein the determining the memory access category for a task comprises:
    determining a memory access category corresponding to a memory address range accessed by the tasks in response to determining that the memory access category does not comprise a cache hostile access category.

13. The system of claim 12, wherein each of the pattern of memory accesses is defined as at least one range of memory addresses or a cache hostile access category.

14. The system of claim 9, wherein the operations further comprise:
    gathering information on task resource usage for each of the memory access categories while executing the computer program;
    based on the task resource usage, determining a number of at least one processing unit to assign to each of the memory access categories; and
    indicating, for each memory access category of the memory access categories, the number of at least one processing unit determined to assign to the memory access category.

15. The system of claim 14, wherein the determining the number of at least one processing unit to assign to each memory access category of the memory access categories comprises:
    determining whether tasks operating in a memory address range corresponding to a memory access category of the memory access categories consume a threshold amount of processing resources; and
    indicating that the memory access category is assigned multiple processing units in response to determining that the tasks operating in the memory address range corresponding to the memory access category consume more than the threshold amount of processing resources.

16. The system of claim 15, wherein the operations further comprise:
    indicating, in a dispatch table having an entry for each memory access category of the memory access categories, at least one processing unit assigned to process tasks assigned to the memory access category and a processor chip including the at least one processing unit assigned to the memory access category.

17. A method for profiling memory access in a memory shared by tasks executing in a computer system, comprising:
    processing a computer program in which tasks are coded to determine ranges of memory addresses each task of the tasks accesses;
    determining, for each task of a plurality of tasks coded in the computer program, a memory access category for the task based on the determined ranges of memory addresses accessed by the task, wherein the determined memory access category indicates a pattern of memory accesses for the task, wherein the determined memory access category comprises one of a plurality of memory access categories defined by different memory access patterns; and
    indicating, in an assignment of memory access categories, the determined memory access category for each task for which the memory access category is determined, wherein the assignment of memory access categories is used to dispatch tasks to processing units.

18. The method of claim 17, wherein the processing the computer program comprises executing the computer program in a debugging mode to determine ranges of memory address each tasks coded in the computer program executes.

19. The method of claim 17, wherein the determining the memory access category for a task comprises:
    determining whether the determined ranges of memory addresses accessed by the task exceeds a threshold number of ranges of memory addresses; and
    determining that the memory access category for a task comprises cache hostile access category in response to determining that the ranges of memory addresses accessed by the task exceeds the threshold number of ranges.

20. The method of claim 17, further comprising:
    gathering information on task resource usage for each of the memory access categories while executing the computer program;
    based on the task resource usage, determining a number of at least one processing unit to assign to each of the memory access categories; and
    indicating, for each memory access category of the memory access categories, the number of at least one processing unit determined to assign to the memory access category.

* * * * *